(12) United States Patent
Voelker et al.

(10) Patent No.: US 12,014,263 B2
(45) Date of Patent: Jun. 18, 2024

(54) METHODS AND SYSTEMS FOR ENCODING AND PROCESSING VECTOR-SYMBOLIC REPRESENTATIONS OF CONTINUOUS SPACES

(71) Applicant: Applied Brain Research Inc., Waterloo (CA)

(72) Inventors: Aaron Russell Voelker, Stittsville (CA); Christopher David Eliasmith, Waterloo (CA); Brent Komer, London (CA); Terrence Stewart, Waterloo (CA)

(73) Assignee: APPLIED BRAIN RESEARCH INC., Waterloo (CA)

( * ) Notice: Subject to any disclaimer, the term of this patent is extended or adjusted under 35 U.S.C. 154(b) by 904 days.

(21) Appl. No.: 16/823,245

(22) Filed: Mar. 18, 2020

(65) Prior Publication Data
US 2020/0302281 A1    Sep. 24, 2020

Related U.S. Application Data

(60) Provisional application No. 62/820,089, filed on Mar. 18, 2019.

(51) Int. Cl.
*G06N 3/06*     (2006.01)
*G06N 3/049*    (2023.01)
*G06N 3/063*    (2023.01)

(52) U.S. Cl.
CPC ............. *G06N 3/063* (2013.01); *G06N 3/049* (2013.01)

(58) Field of Classification Search
CPC .................. G06N 3/063; G06N 3/049
See application file for complete search history.

(56) References Cited

U.S. PATENT DOCUMENTS

| | | | |
|---|---|---|---|
| 2014/0156577 A1* | 6/2014 | Eliasmith | G06N 3/10 706/26 |
| 2018/0225570 A1 | 8/2018 | Eliasmith | |
| 2022/0138382 A1* | 5/2022 | Voelker | G06F 30/27 703/2 |

OTHER PUBLICATIONS

Gosmann, "An Integrated Model of Context, Short-Term and Long-Term Memory", 2018, pp. 1-172 (Year: 2018).*
Eliasmith et al., "Large-Scale Synthesis of Functional Spiking Neural Circuits", May 2014, IEEE, vol. 102 No. 5, pp. 881-898 (Year: 2014).*
Stewart et al., "A Biologically Realistic Cleanup Memory: Autoassociation in Spiking Neurons", 2011, Cognitive Systems Research 12, pp. 84-92 (Year: 2011).*
Holographic Reduced Representations, Plate, Tony, IEEE Trasactions on Neural Networks 6:3:623-641, 1995.

(Continued)

*Primary Examiner* — Paulinho E Smith
(74) *Attorney, Agent, or Firm* — Jenna L. Wilson; Wilson Lue LLP

(57) ABSTRACT

The present invention relates to methods and systems for encoding and processing representations that include continuous structures using vector-symbolic representations. The system is comprised of a plurality of binding subsystems that implement a fractional binding operation, a plurality of unbinding subsystems that implement a fractional unbinding operation, and at least one input symbol representation that propagates activity through a binding subsystem and an unbinding subsystem to produce a high-dimensional vector representation of a continuous space.

8 Claims, 6 Drawing Sheets

(56) References Cited

OTHER PUBLICATIONS

Vector Symbolic Architectures answer Jackendoff's challenges for cognitive neuroscience, Gayler, Ross, arXiv:cs/0412059, 2004.
Eric Weiss et al. "Neural Architechture for Representing and Reasoning About Spatial Relationships". 2016, XP055718172, Retrieved from the Internet: URL:https://openreview.net/pdf?id=XL9vWQ4gHXB8D1RUGVj.
Ivo Danihelka et al. "Associative Long Short-Term Memory" arxiv.org, Cornell University Library, 201 Olin Library Cornell University Ithaca, NY 14853, Feb. 9, 2016 (Feb. 9, 2016), XP080682526.
Feng-Xuan Choo. "Extending the World's Largest Functional Brain Model" May 17, 2018 (May 17, 2018), XP055718689, Retrieved from the Internet: URL:https://pdfs.semanticscholar.org/90e0/Pc6febadlfe6b1768a34294938e221b8e379.pdf?ga=2.244772037.15407588.1595861849-863095I 09.1580986395.
Jan Gosmann. An Integrated Model of Context, Short-Term, and Long-Term Memory. 2018, XP055718227, Retrieved from the Internet: URL:https://uwspace.uwaterloo.ca/bitstream/handle/10012/13498/Gosmann Jan.pdf [retrieved on Jul. 27, 2020].
European Search Report. dated Aug. 12, 2020 re: European Patent Application No. 20163827.7.

\* cited by examiner

METHODS AND SYSTEMS FOR ENCODING AND PROCESSING VECTOR-SYMBOLIC REPRESENTATIONS OF CONTINUOUS SPACES

(1) FIELD OF THE INVENTION

The present invention generally relates to the field of encoding and processing structured representations, and more particularly the present invention relates to methods and systems for encoding and processing representations that include continuous structures using vector-symbolic representations.

(2) BACKGROUND OF THE INVENTION

The ability to reason about relationships between entities in continuous domains is required to perform a wide range of intelligent behaviors. For example, finding a path from one location to another involves reasoning about the relative positions of a number of intermediate locations. Similar forms of spatial reasoning underlie planning in general and can be applied to any domain in which relationships between discrete entities are characterized by a continuous distance function.

Any effort to implement spatial reasoning in an artificial system confronts the challenge of accommodating both continuous and discrete representational structures. Conventional computer algorithms that operate on symbols are efficient at representing discrete structures such as graphs, lists, and trees, but are less efficient at representing continuous structures such as two-dimensional planes. Artificial neural network (ANN) algorithms, by comparison, are well-suited to processing continuous structures such as planes and images, but do not naturally represent discrete symbols. One approach to combining the strengths of these two families of algorithms involves defining a 'vector symbolic architecture' (VSA) in which symbols are mapped to vectors in a high-dimensional space, and operations on these vectors performed by an ANN are used to implement symbol processing. However, existing VSAs limit their use of continuous vectors to only represent discrete structures comprised of slots and fillers, and therefore cannot be used to represent continuous relationships between entities, or to simulate the dynamics of continuous systems.

A number of different types of devices for encoding and processing discrete vector-symbolic structures are available in prior art. The following documents and patents are provided for their supportive teachings and are all incorporated by reference: Prior art document http://www2.fiit.stuba.sk/~kvasnicka/CognitiveScience/6.prednaska/plate.ieee95.p df describes methods for representing compositional symbol structures with distributed vector representations. These methods use circular convolution to associate symbolic items represented by vectors via a form of variable binding. Circular convolution is a compression operation that enables the creation of sequences of various lengths and simple frame like structures, all of which are represented in fixed width vector representations. These vector representations can be bound together to form arbitrarily complex compositional structures. The compression noise present in items extracted from such compositional structures can be cleaned up by using a separate associative memory system.

Another prior art document, https://arxiv.org/abs/cs/0412059 discusses solving the challenge of mapping between symbol structures and ANN activities. This document introduces the concept of a VSA in which symbols are mapped to vectors in a high-dimensional space, and operations on the vectors are used to implement symbol processing.

A further prior art document, patent EP2741242A1, discloses methods, systems, and an apparatus that provide for perceptual, cognitive, and motor behaviors in an integrated system implemented using neural architectures. Components of the system communicate using artificial neurons that implement neural networks. The connections between these networks form representations—referred to as semantic pointers—which model the various firing patterns of biological neural network connections. Semantic pointers can be thought of as elements of a neural vector space, and can implement a form of compression in which high-dimensional structures can be abstracted one or more times thereby reducing the number of dimensions needed to represent a particular vector-symbolic structure.

However, the methods and systems described in the aforementioned references and many similar references do not enable the creation of vector-symbolic representations that use fractional binding to represent continuous spaces or flexibly blend continuous and discrete structures with one another.

The present application addresses the above-mentioned concerns and shortcomings with regard to providing the methods and systems for encoding and processing vector-symbolic representations of continuous spaces. These representations are defined over spaces in which both slots and fillers can be separated by a continuous distance function. Example uses of these representations include modeling spatial relationships between objects, modelling temporal relationships between events, and modeling or simulating arbitrary dynamical systems.

(3) SUMMARY OF THE INVENTION

In the view of the foregoing limitations inherent in the known methods for encoding and processing structured representations and the concept of vector symbolic architectures present in the prior art, the present invention provides methods and systems for encoding and processing representations of continuous spaces. More specifically, the present invention introduces a method and system for manipulating "spatial semantic pointers" (SSPs), which are a kind of vector-symbolic representation in which slot-filler bindings defined over spaces in which either or both slots and fillers can be separated by a continuous distance function. Subsystems that carry out binding, unbinding, and transformation with these continuous slot-filler structures can be applied recursively to manipulate arbitrarily complex compositions of representations. As such, the general purpose of the present invention, which will be described subsequently in greater detail, is to provide methods and systems for encoding and processing vector-symbolic representations that consist of flexible blends of continuous and discrete structures, and thereby go significantly beyond what is defined in the prior art.

The main aspect of the present invention is to provide methods and systems for encoding and processing continuous structures using vector-symbolic representations of continuous spaces. The methods and systems for encoding and processing these representations are comprised of a plurality of binding subsystems that implement fractional binding operations to compose SSPs, a plurality of unbinding subsystems that implement fractional unbinding operations to decompose SSPs, and one or more input representations that propagates activity through the binding subsystem and the unbinding subsystem to produce high-dimensional vector representations of structures that include continuous relationships between elements.

In an embodiment of the invention, there is disclosed a system for encoding and processing representations of continuous structure using vector-symbolic representations of continuous spaces including a plurality of binding subsystems that implement a fractional binding operation that generates slots and/or fillers ranging over spaces in which one or both of slots and fillers can be separated by a continuous distance function, a plurality of unbinding subsystems that implement the approximate inverse of a fractional binding operation that disassociates slot-filler pairs ranging over spaces in which one or both of slots and fillers can be separated by a continuous distance function, one or more input representations that propagate activity through said binding subsystems and said unbinding subsystems to produce high-dimensional vector representations of said continuous space.

In an aspect of the invention, there is provided a plurality of transformation subsystems that implement transformations of vector-symbolic representations composed of slot-filler pairs ranging over spaces in which one or both of slots and fillers can be separated by a continuous distance function are connected to the output of the binding or unbinding systems.

In an aspect of the invention, said transformations are used to simulate the dynamics of the represented continuous space, and to predict the particular changes to entities located in this space.

In an aspect of the invention, a plurality of cleanup subsystems that match noisy or corrupted vectors to their uncorrupted counterparts are connected to the output of the binding or unbinding systems.

In an aspect of the invention, said binding and said unbinding subsystems are artificial neural networks implemented in network layers, and wherein each said network layer comprises a plurality of nonlinear components, and each said nonlinear component is configured to generate an output in response to said input representation, and wherein said output from each said nonlinear component is weighted by coupling weights of corresponding weighted couplings and weighted outputs are provided to coupled said network layers, and wherein said vector-symbolic representations corresponds to plurality of data structures and a plurality of human-interpretable data types that involve continuous values.

In an aspect of the invention, said input representations to the system are either discrete or continuous in time and in value.

In an aspect of the invention, said binding and said unbinding networks apply a constant fractional binding or unbinding operation to a single input representation.

In an aspect of the invention, said binding and said unbinding networks apply a variable fractional binding or unbinding operation determined by one input representation to a second input representation.

In an aspect of the invention, said binding, said unbinding, and said transformation networks are implemented repeatedly, recursively, and/or sequentially to perform multiple steps of processing.

In an aspect of the invention, said nonlinear components are software simulations of neurons to generate spikes.

In an aspect of the invention, said nonlinear components are implemented in special-purpose hardware including neuromorphic computers.

In an aspect of the invention, either slots or fillers are bound with integer bindings.

In another embodiment of the invention, there is provided a method for encoding and processing representations of continuous structure using vector-symbolic representations of continuous spaces including defining a plurality of binding subsystems that implement a fractional binding operation that generates slots and/or fillers ranging over spaces in which one or both of slots and fillers can be separated by a continuous distance function; defining a plurality of unbinding subsystems that implement the approximate inverse of a fractional binding operation that disassociates slot-filler pairs ranging over spaces in which one or both of slots and fillers can be separated by a continuous distance function; defining at least one input representation that propagates activity through the said binding subsystem and said unbinding subsystem to produce high-dimensional vector representations of said continuous spaces.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

(4) BRIEF DESCRIPTION OF THE DRAWINGS

The invention will be better understood and objects other than those set forth above will become apparent when consideration is given to the following detailed description thereof. Such description makes reference to the annexed drawings wherein.

(5) DETAILED DESCRIPTION OF THE INVENTION

Figures 1, 2A:
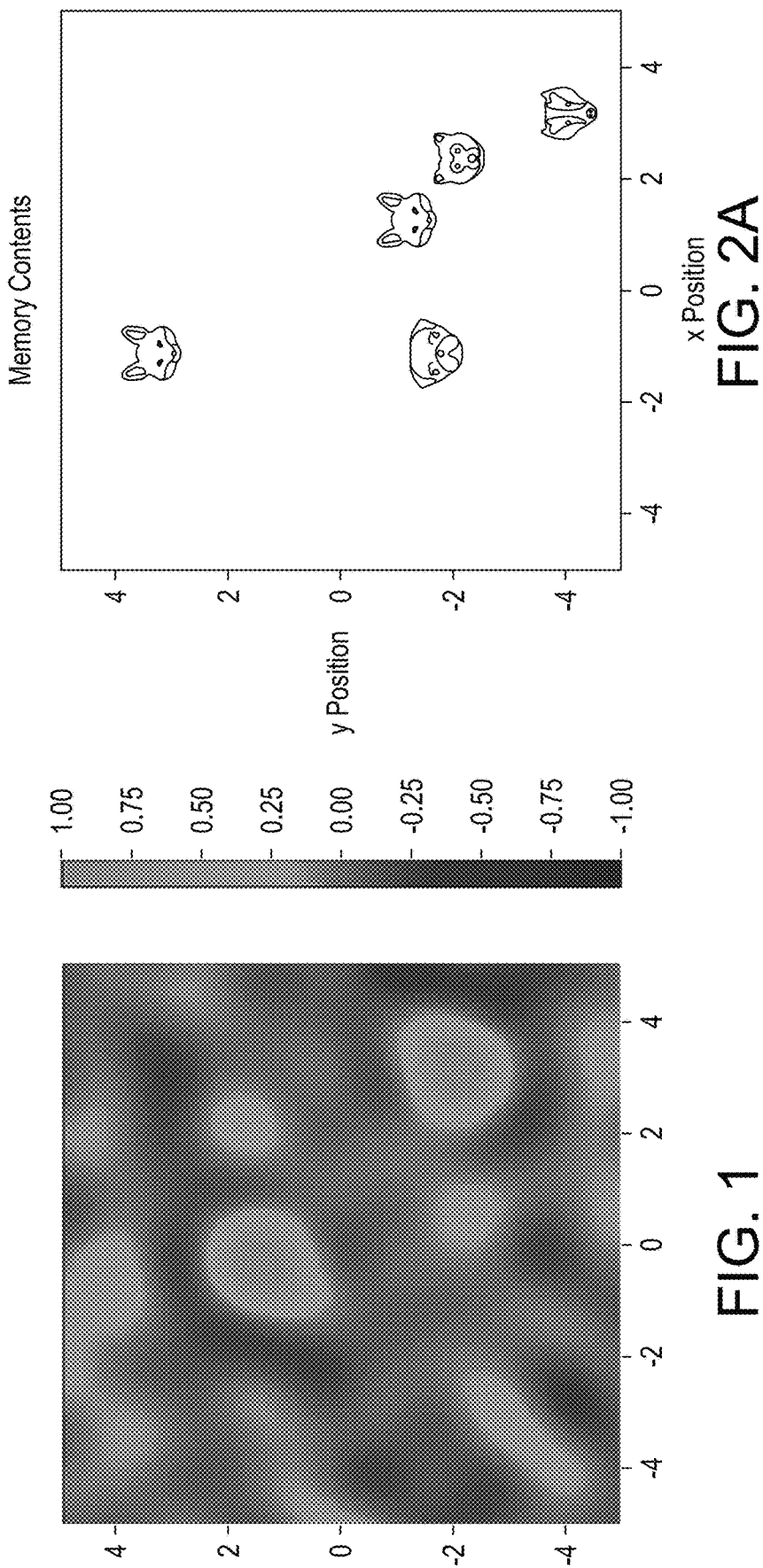
FIG. 1 is an illustration of a spatial semantic pointer representation that encodes the positions of two discrete objects in a continuous two-dimensional plane.
FIG. 2A-2C show an illustration of how a spatial semantic pointer representation can be used to encode and reason about spatially separated entities.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the exemplary drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure, and are not meant to be limiting in any fashion.

As used herein, the terms "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing. Certain terms used in this description are defined as follows:

spaces (vector)—a set of objects (vectors) that have addition and scalar multiplication defined over them distance function—a function that defines a measure (distance) between any pair of elements in a set continuous distance function—a distance function with no abrupt changes in value (discontinuities)

slots—labels in a structure indicating an attribute of the overall structure fillers—a value that is associated with an attribute in a structure slot-filler pair—an attribute-value combination in a structure binding operator—a mathematical operator that defines a function that maps two input vectors to a bound output vector. The inputs may be a slot and a filler, with the output a representation of the slot-filler pair.

unbinding operator—a mathematical operator that defines a function that maps two input vectors, consisting of a constituent and a bound vector, to a constituent output vector. The inputs may be a slot-filler pair and a slot (or filler), with the output the filler (or slot).

integer binding—application of a binding operator an integer number of times fractional binding—application of a binding operator a fractional number of times binding subsystem—a subsystem that implements a binding operator unbinding subsystem—a subsystem the implements an unbinding operator Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

For simplicity and clarity of illustration, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

The embodiments of the digital circuits described herein may be implemented in configurable hardware (i.e. FPGA) or custom hardware (i.e. ASIC), or a combination of both with at least one interface. The input signal is consumed by the digital circuits to perform the functions described herein and to generate the output signal. The output signal is provided to one or more adjacent or surrounding systems or devices in a known fashion.

As used herein the term 'neuron' refers to spiking neurons, continuous rate neurons, or arbitrary non-linear components used to make up a distributed system.

The described systems can be implemented using adaptive or non-adaptive components. The system can be efficiently implemented on a wide variety of distributed systems that include a large number of non-linear components whose individual outputs can be combined together to implement certain aspects of the system as will be described more fully herein below.

The main embodiment of the present invention is to provide methods and systems for encoding and processing representations including continuous structures using vector-symbolic representations of continuous spaces. The methods and systems for encoding and processing these vector-symbolic representations of continuous spaces are comprised of a plurality of binding subsystems that implement a fractional binding operation, a plurality of unbinding subsystems that implement a fractional unbinding operation, and at least one input symbol representation that propagates activity through a binding subsystem and an unbinding subsystem to produce a high-dimensional vector representation of a continuous space.

The vector representation corresponds to a plurality of data structures and a plurality of human-interpretable data types. The plurality of data structures may include planes, volumes, images, and time-series. The plurality of human-interpretable data types may include maps, scenes, sounds, and images. The term 'representation' alone refers to either basic or complex representations. The neural network layer in the present invention refers to a collection of simulated neurons that accumulate input from one or more other collections of simulated neurons and propagates output to one or more other collections of simulated neurons.

A 'binding network' here refers to a network whose connections implement a compression operation that creates a pairwise fractional binding between two representations referred to as a 'slot' or a 'filler'. If k is a natural number, $B \in R^d$ is a fixed d-dimensional vector, and $\circledast$ is a binding operator, then a non-fractional binding of B to itself k−1 times is:

$$B^k = B \circledast B \circledast B \ldots \circledast B \quad (1)$$

where B occurs on the right-hand side of the equation k times. By analogy to fractional powers defining the multiplication of the real numbers, if k is instead a real number, then $B^k$ encodes a continuous quantity. Assuming that the operator $\circledast$ is circular convolution, then a fractional binding is defined by expressing equation (1) above in the complex domain:

$$B^k = \mathcal{F}^{-1}\{\mathcal{F}\{B\}^k\}, k \in \mathbb{R} \quad (2)$$

where $F\{\cdot\}$ is the Fourier transform, and $F\{B\}^k$ is an element-wise exponentiation of a complex vector. In essence, fractional binding is to a binding operator as exponentiation is to multiplication.

Fractional binding operations are used to create bindings that link particular representations to particular locations in continuous spaces corresponding to lines, planes, volumes, or spans of time. Multiple such bindings are collected via superposition into a single vector that represents the state of the continuous space; such a vector is an example of a "spatial semantic pointer". In general, fractional binding can be used to represent points in $R^n$ by repeating equation (2) n times, using a different base vector B for each represented dimension (i.e., for each axis). For an encoding of a point in a two-dimensional plane, n=2, and the vector representation the point's (x, y) coordinates is defined as:

$$S(x,y) = X^x \circledast Y^y \quad (3)$$

where X and Y are vector representations, x and y are reals, exponentiation indicates fractional binding, and $\circledast$ indicates non-fractional binding.

Spatial semantic pointers that represent continuous regions rather than points are defined by integrating over semantic pointers corresponding to each point in the region as follows:

$$S(R) = \int_{(x,y) \in R} X^x \int_{(x,y) \in R} Y^y dx dy \quad (4)$$

where R denotes the region of interest being encoded. To represent a discrete entity occupying some point or region in a continuous space, non-fraction binding is performed to associate a vector representation of the entity to an SSP representation a point or region as defined using equation (3) or equation (4) above:

$$M = \text{ENTITY} \circledast S \quad (5)$$

where M is a 'memory' SSP that stores the location of the entity in the continuous space as defined by S. It is possible to represent sets of m labelled entities in the same memory using superposition or vector addition:

$$M = \sum_{i=1}^{m} \text{ENTITY}_i \circledast S_i \quad (6)$$

Representations of entities and the continuous spaces they occupy may each be structured to an arbitrary degree of complexity, in the sense of consisting of combinations of simple and complex representations. Simple representations in the present invention are random unit-length vectors of dimension d, which ensures that the vector components are identically distributed, and that all of the vectors are approximately orthogonal to one another. Complex representations include some number of simple representations as constituent parts.

Representation comparisons are performed via the normalized dot product, which is close to zero for all approximately orthogonal vectors. Comparisons of this sort are used to interpret the results of manipulations to the underlying continuous space represented by a particular SSP. For example, the positions of various objects on plane might be encoded into an SSP as shown in FIG. 1, and manipulations of SSP can be used to extract information via unbinding about which objects occupy which locations on the plane. To produce the SSP visualization shown in FIG. 1., a heatmap is constructed by performing dot products between the positional encoding M and a set of point encodings that tile the xy plane using some tiling distance $\Delta$ along each axis of the plane.

An 'unbinding network' refers to a network that inverts fractional and non-fractional binding operations to extract either the entity or entities corresponding to a particularly point or region in a continuous space, or the points or regions corresponding to a particular entity or entities. For example, in the case of a memory representation of the sort defined in equation (6) above for a two-dimensional plane, it is possible to determine which entity is represented at point (x, y) as follows:

$$M \circledast (X^x \circledast Y^y)^{-1} = M \circledast X^{-x} \circledast Y^{-y} \quad (7)$$

By the properties of binding and superposition, the resulting vector will have the highest cosine similarity with the representation of the entity located at point (x, y).

A vector decoded from an SSP using an unbinding operation is noisy and only somewhat similar to the vector corresponding to the matching entity or region in a continuous space. A cleanup subsystem can be used to match a noisily decoded vector to its clean counterpart. A 'cleanup network' is a network that implements cleanup matching either using closed-form functions (e.g., max), spiking neural networks, or non-spiking neural networks. If too much noise is present in a decoded vector, a cleanup network will produce an incorrect match, leading to erroneous processing that mischaracterizes the state of the underlying continuous space being represented by a particular vector-symbolic representation. The degree of noise present during decoding is determined both by the complexity of the representational structure being decoded, and by the amount of compression loss introduced by the fractional or non-fractional binding operation being used.

Figure 2B:
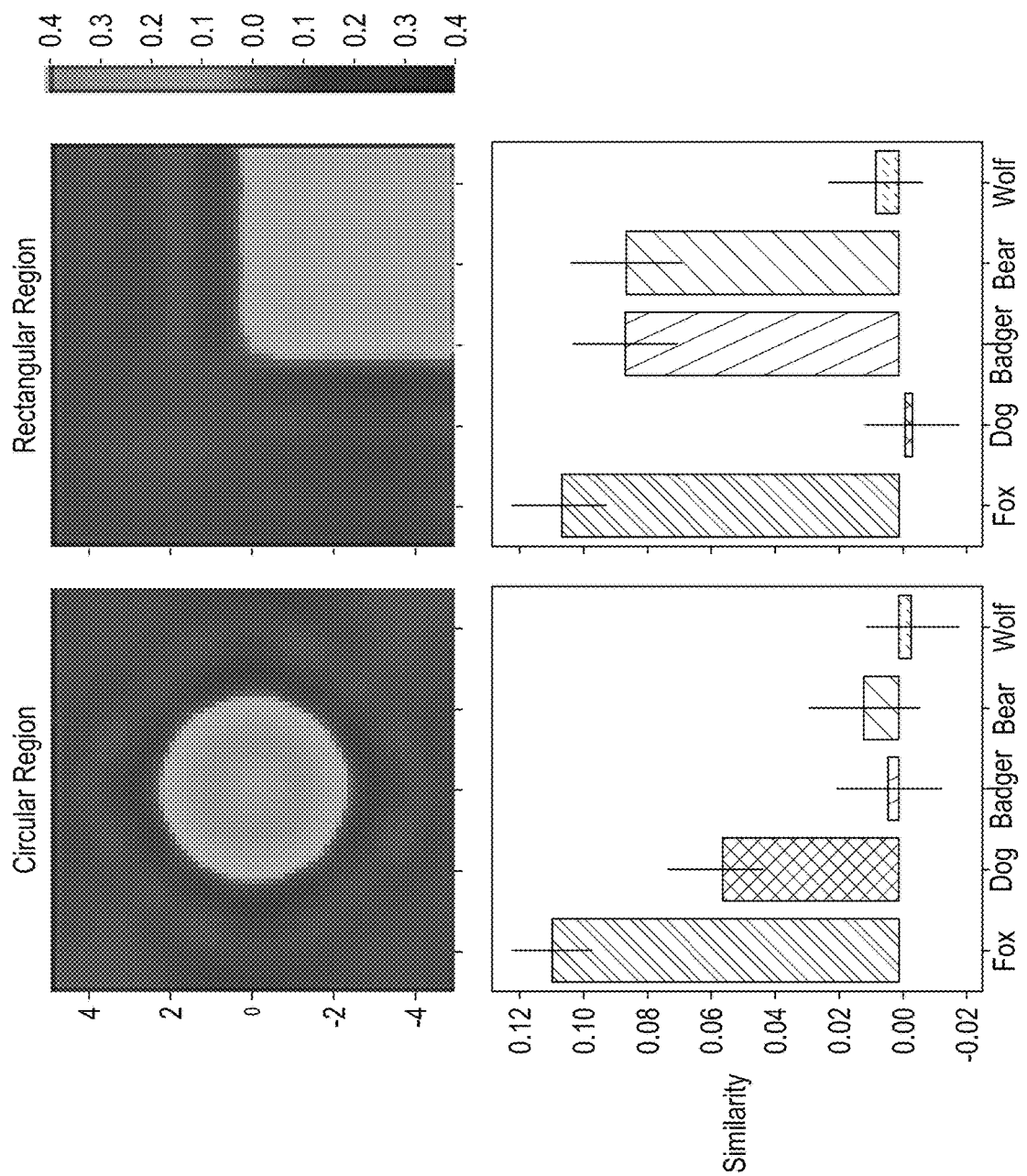
Figure 2C:
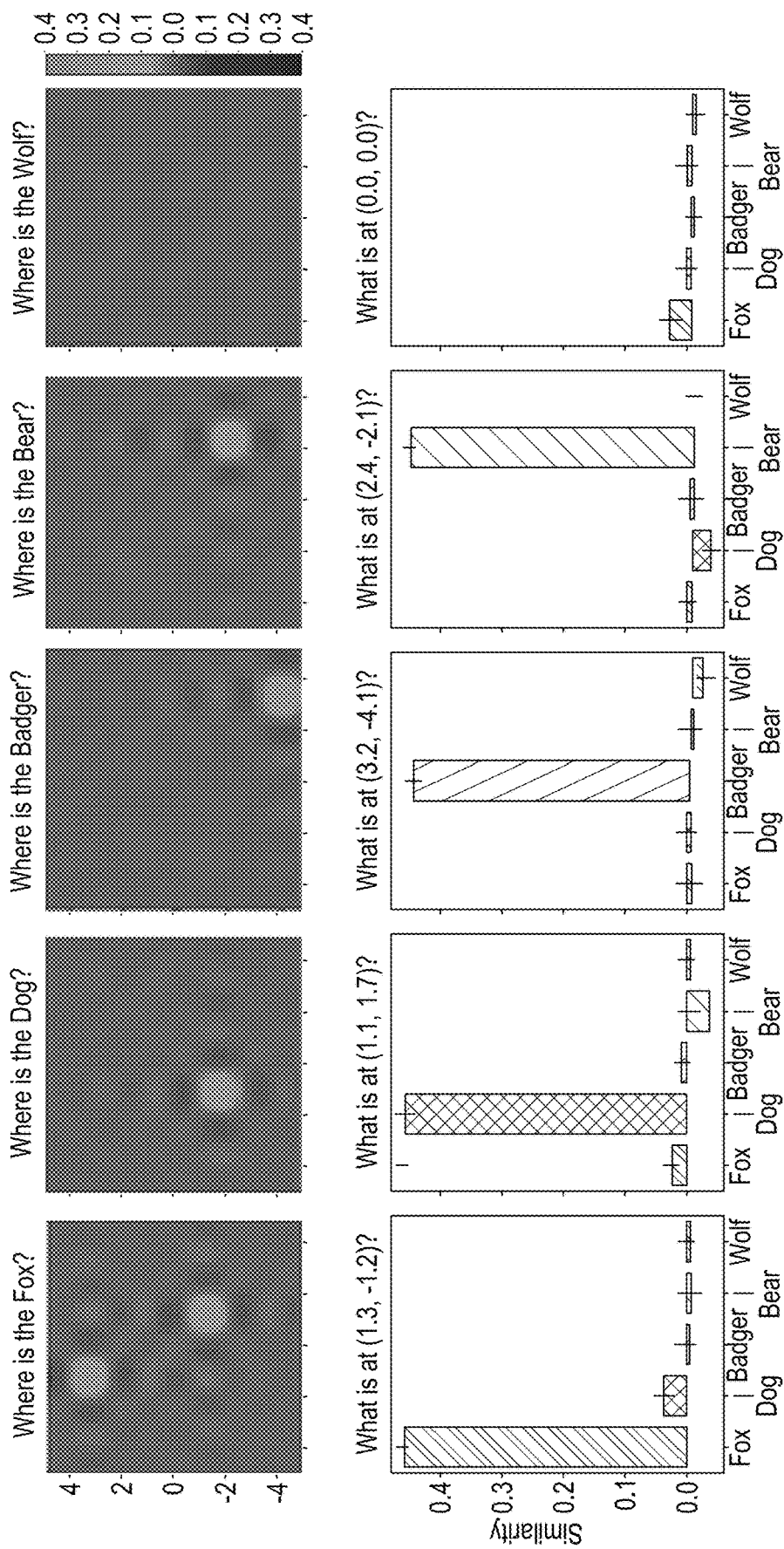

The coupling of binding, unbinding, and cleanup networks enables SSPs to be queried for a variety of different kinds information. FIG. 2. illustrates the kinds of queries that can be applied to SSPs in the context of a two-dimensional plane occupied by various entities (animals in this case). The upper-left section (a) depicts the contents encoded into an example SSP, while the upper right section (b) depicts the results of decoding the entities located in particular regions in accordance with equations (4) and (7) above. The lower section (c) depicts the results of decoding the locations of entities (top) along with the entities at particular locations (bottom). Similar kinds of queries can be applied to SSPs that represent arbitrary continuous quantities such as mass, color, time, and distance.

Figure 3:
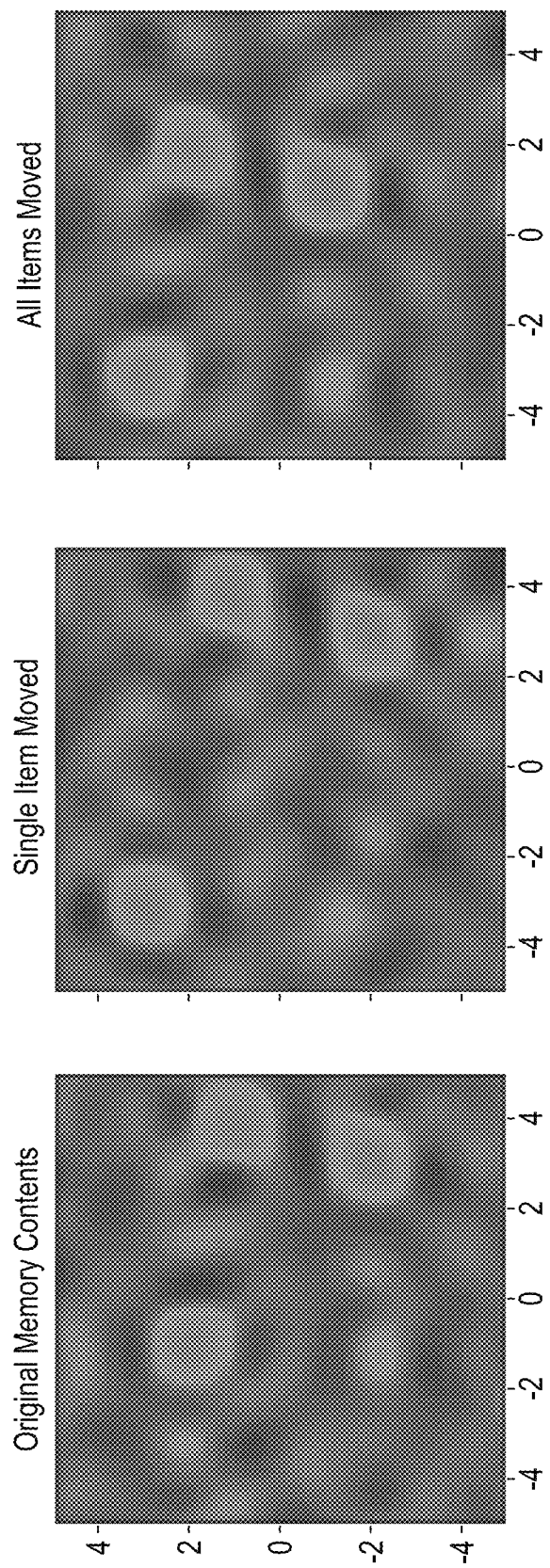
FIG. 3 is an illustration of how a spatial semantic pointer representation can be transformed to simulate changes to spatially represented entities.

A 'transformation network' is a network that implements linear or non-linear transformations of vector-symbolic representations of continuous spaces. Transformations modify or update the contents of an SSP in-place, and can be used to simulate the dynamics of an underlying continuous space, or to predict the effects of various changes in this space. An example of a relevant transformation involves computing the difference between two vectors corresponding to distinct points in a continuous space. The output of this transformation can then be used to simulate a "shift" of an entity in the continuous space by an amount equal to the resulting difference, as shown in FIG. 3. The resulting change to an SSP representing the space is defined as:

$$\Delta M = \text{ENTITY} \circledast \Delta S \quad (8)$$

where $\Delta S$ represents the shift to be applied to the entity. FIG. 3 also illustrates the effect of a similar transformation that shifts every entity represented by an SSP by a specified distance. Applications of these shifting transformations can be used to simulate the dynamics of a changing continuous space. For example, transformations that implement the motion of an entity along a trajectory can be used to infer the entities' position at a future time along with its likely interactions with other entities. Generalizations of these transformations ensure that SSPs can in principle be used to simulate the dynamics of continuous systems.

Figure 4:
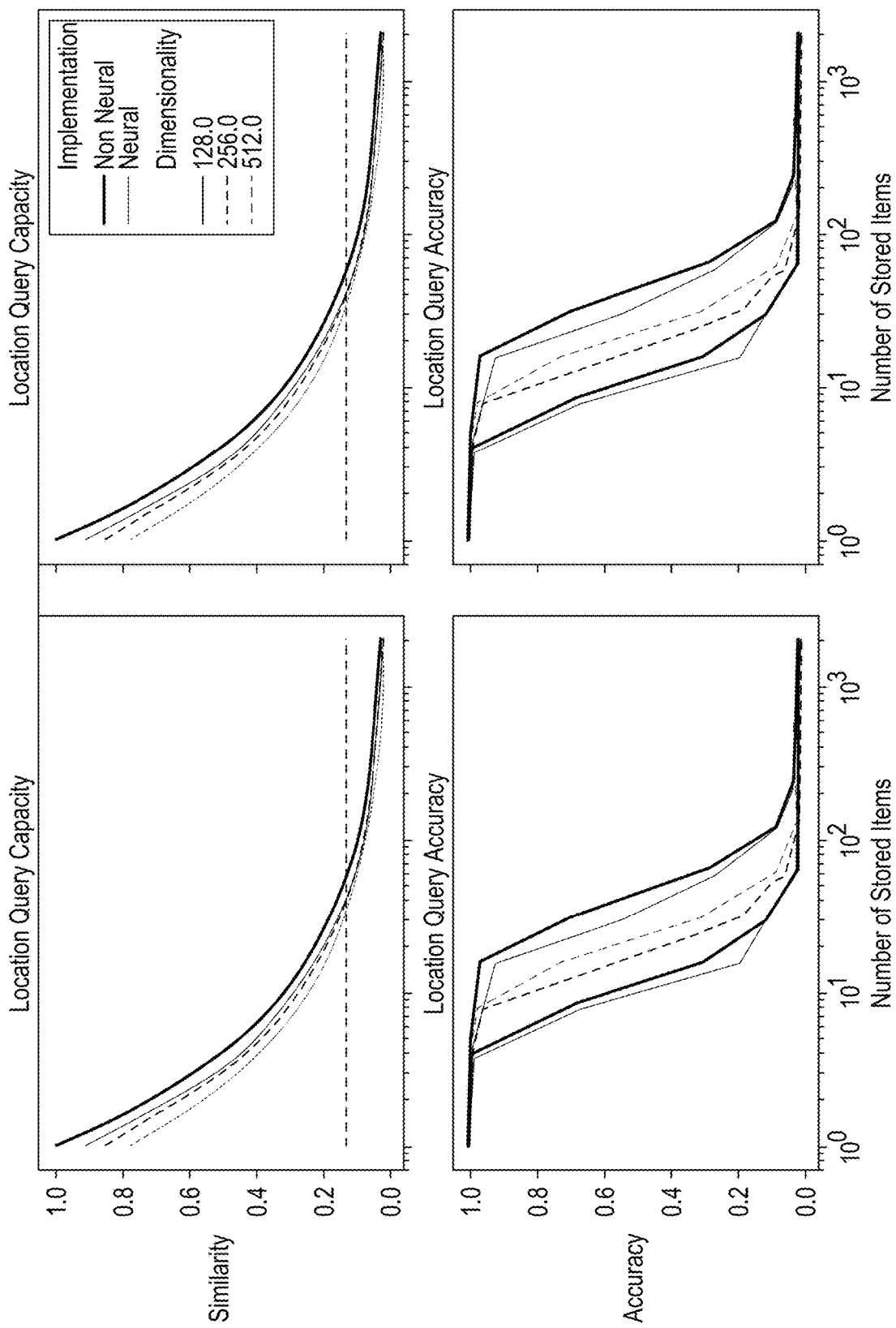
FIG. 4 is an illustration of memory capacity and processing accuracy as a function of number items stored in a spatial semantic pointer representation.

Given that the binding, unbinding, and transformation subsystems can introduce noise into SSP representations that potentially degrade processing performance, it is useful to quantify the storage capacity of these representations along with the accuracy of queries applied to them. FIG. 4 illustrates storage capacity and accuracy as a function of the number of entities represented in the SSP, for both neural and non-neural implementations of the subsystems. The top portion of the figure shows the entity and position capacity, while the bottom portion shows the entity and position decoding accuracy. The horizontal dotted lines indicate a threshold for matching noisily decoded vector representations to their uncorrupted counterparts.

The individual computing elements within the networks used to perform binding operations, unbinding operations, transformation operations, and to clean up vector representations can vary. Optionally they may be artificial neurons. Such computing elements or input representations may transmit a constant value, and are thereby non-spiking. Sometimes the computing elements emit occasional pulses in a manner determined by their input, and are thereby spiking. Spiking elements may be artificial neurons. Spiking versions of such neural networks are in some cases implemented using conventional computers via software that emulates the process by which a neuron input triggers a spike. In other cases, the neural networks are implemented using neuromorphic hardware that physically instantiates spike-based communication between computing elements. The binding and the unbinding networks in the present invention apply fractional binding or unbinding operation to a single input representation.

The input processing in the present invention with vector-symbolic representations of continuous spaces can involve arbitrary sequences of binding, unbinding, transformation, and cleanup operations, each of which are implemented by binding networks, unbinding networks, transformation networks, and cleanup networks, respectively. The same networks may be used repeatedly by communicating the outputs of one network to the input of another network in arbitrary sequential order. Optionally, multiple networks may be coupled to one another in arbitrary sequential order.

The nonlinear components can be implemented using a combination of adaptive and non-adaptive components. The system can be efficiently implemented on a wide variety of distributed systems that include a large number of nonlinear components whose individual outputs can be combined together to implement certain binding and unbinding operations. Examples of nonlinear components that can be used in various embodiments described herein include simulated/ artificial neurons, FPGAs, GPUs, and other parallel computing systems. Components of the system may be implemented using a variety of standard techniques such as by using microcontrollers. In addition, optionally non-linear component may be implemented in various forms including software simulations, hardware, or any neuronal fabric. In multiple medium non-linear component may implement such as Neurogrid, SpiNNaker, OpenCL, Loihi, and TrueNorth.

To implement binding, unbinding, transformation, and cleanup networks with spiking neurons, the standard leaky integrate-and-fire (LIF) neuron model may be used in all network layers. Optionally, other spiking neuron models may be used. The vectors corresponding to basic symbols that initially provide input to the system are encoded into spiking activities by injecting a current J into each input layer neuron. This current is proportional to the similarity between the supplied input vector and a vector that characterizes the 'preferred' vector of the neuron. The activity of a neuron can be calculated based on the input current, J, and a nonlinear neuron model G, yielding the activity of each neuron a as:

$$A_i = G[J] \quad (9)$$

The input representations to the system in the present invention are either discrete or continuous in time. The binding, the unbinding, the transformation, and the cleanup networks may be implemented repeatedly, recursively, and/ or sequentially to perform multiple steps of representation processing.

Figure 5:
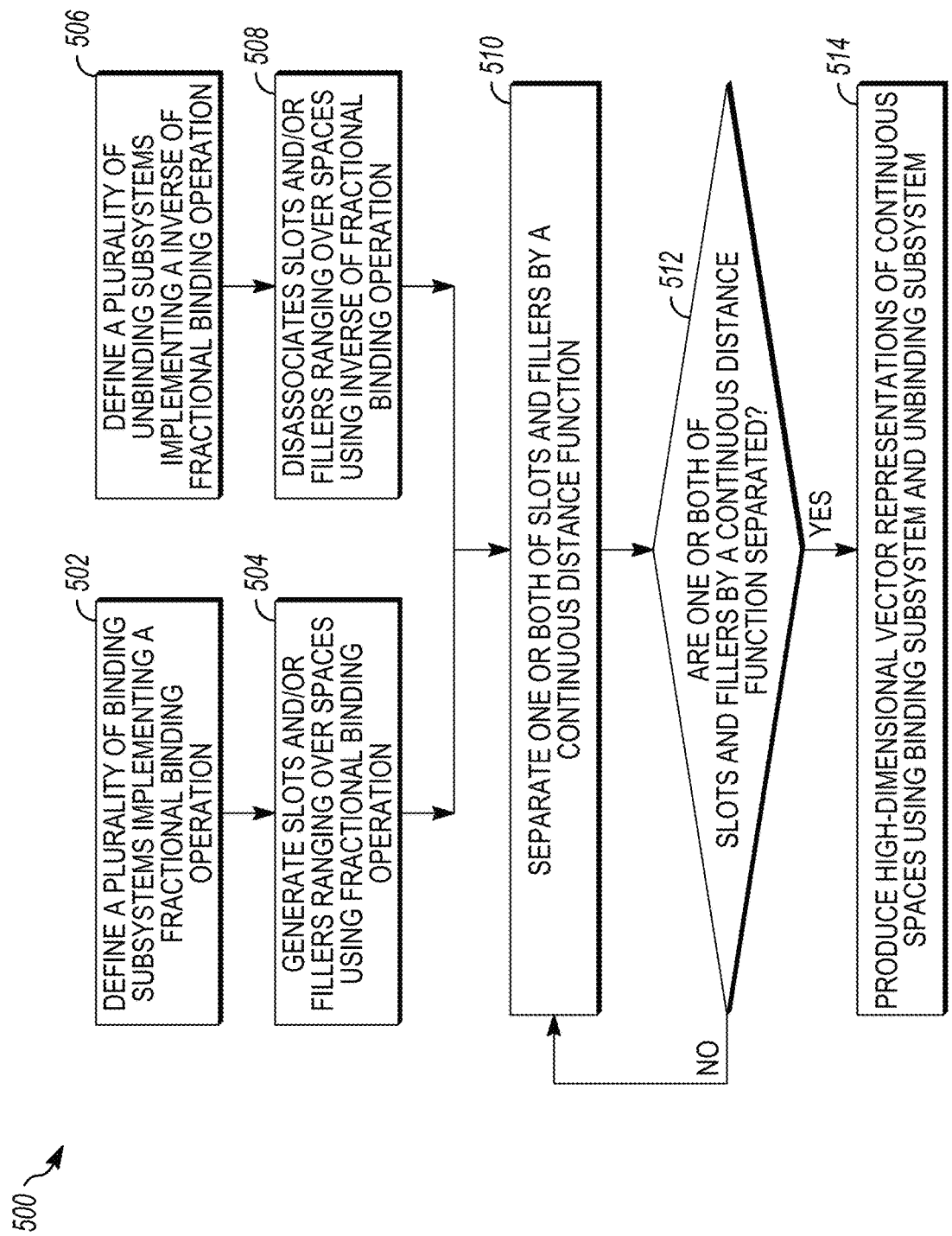
FIG. 5 shows an exemplary method according to an embodiment of the invention.

The method 500 for encoding and processing representations of continuous structure using vector-symbolic representations of continuous spaces includes the following steps, as shown in FIG. 5:

i. defining a plurality of binding subsystems 502 that implement a fractional binding operation that generates 504 slots and/or fillers ranging over spaces in which either or both slots and fillers can be separated by a continuous distance function;

ii. defining a plurality of unbinding subsystems 506 that implement the approximate inverse of a fractional binding operation that disassociates 508 slot-filler pairs ranging over spaces in which either or both slots and fillers can be separated 510 by a continuous distance function;

iii. defining at least one input representation that propagates activity through the said binding subsystem and said unbinding subsystem to produce 514 high-dimensional vector representations of said continuous spaces.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

The invention claimed is:

1. A computer system for processing a high-dimensional vector representation of a data structure, for use in processing in artificial systems, the computer system comprising:
digital circuitry configured to obtain an input representation of a data structure, the data structure representing a continuous space;
the digital circuitry configured to generate a vector representation of the data structure by executing a plurality of binding subsystems that implement a fractional binding operation that generates slots and/or fillers ranging over spaces in which one or both of slots and fillers are separated by a continuous distance function,
the digital circuitry further configured to execute a plurality of unbinding subsystems that implement an approximate inverse of the fractional binding operation that disassociates slot-filler pairs ranging over spaces in which one or both of slots and fillers are separated by the continuous distance function,
wherein said plurality of binding subsystems and said plurality of unbinding subsystems are comprised in an artificial neural network implemented in network layers, and wherein each said network layer comprises a plurality of nonlinear components, and each said nonlinear component is configured to generate an output in response to said input representation, and wherein said output from each said nonlinear component is weighted by coupling weights of corresponding weighted couplings and weighted outputs are provided to coupled said network layers.

2. A computer system according to claim 1, wherein the digital circuitry is further configured to execute a plurality of transformation subsystems that implement transformations of vector-symbolic representations composed of slot-filler pairs ranging over spaces in which one or both of slots and fillers are separated by the continuous distance function are connected to an output of the plurality of binding subsystems or of the plurality of unbinding subsystems.

3. A computer system according to claim 2, where said transformations are used to simulate the dynamics of the represented continuous space, and to predict the particular changes to entities located in the represented continuous space.

4. A computer system according to claim 2, wherein the digital circuitry is further configured to execute a plurality of cleanup subsystems that match noisy or corrupted vectors to their uncorrupted counterparts are connected to the output of the plurality of binding subsystems or of the plurality of unbinding subsystems.

5. The computer system according to claim 1, wherein input representations of the data structure are either discrete or continuous in time and in value.

6. The computer system according to claim 2, wherein said plurality of binding subsystems, said plurality unbinding subsystems, and said plurality of transformation networks are implemented by the digital circuitry repeatedly, recursively, and/or sequentially to perform multiple steps of processing.

7. The computer system according to claim 1, wherein said nonlinear components are software simulations of neurons to generate spikes.

8. The computer system according to claim 1, in which either the slots or the fillers are bound with integer bindings.

* * * * *